INVENTOR
WARREN E. GRAYBEAL

BY John C. Black
ATTORNEY

July 24, 1962  W. E. GRAYBEAL  3,045,801
TRANSFER MECHANISM
Filed March 30, 1960  5 Sheets-Sheet 4
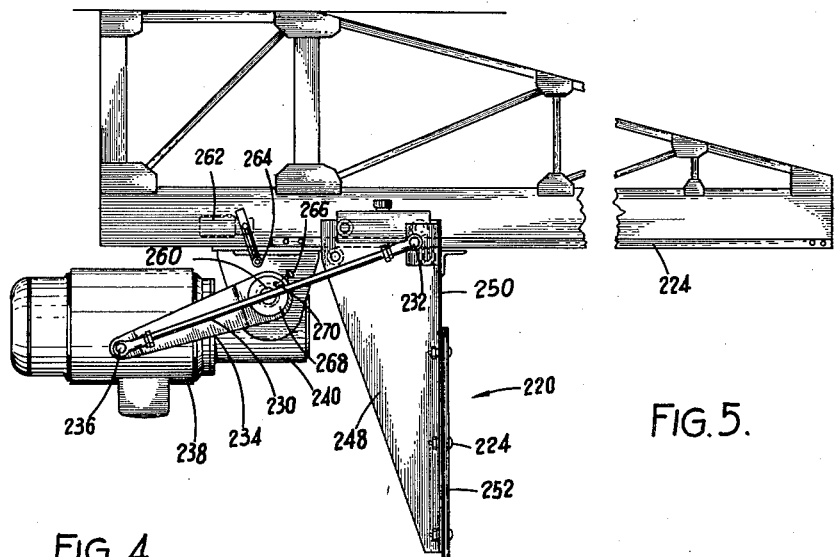
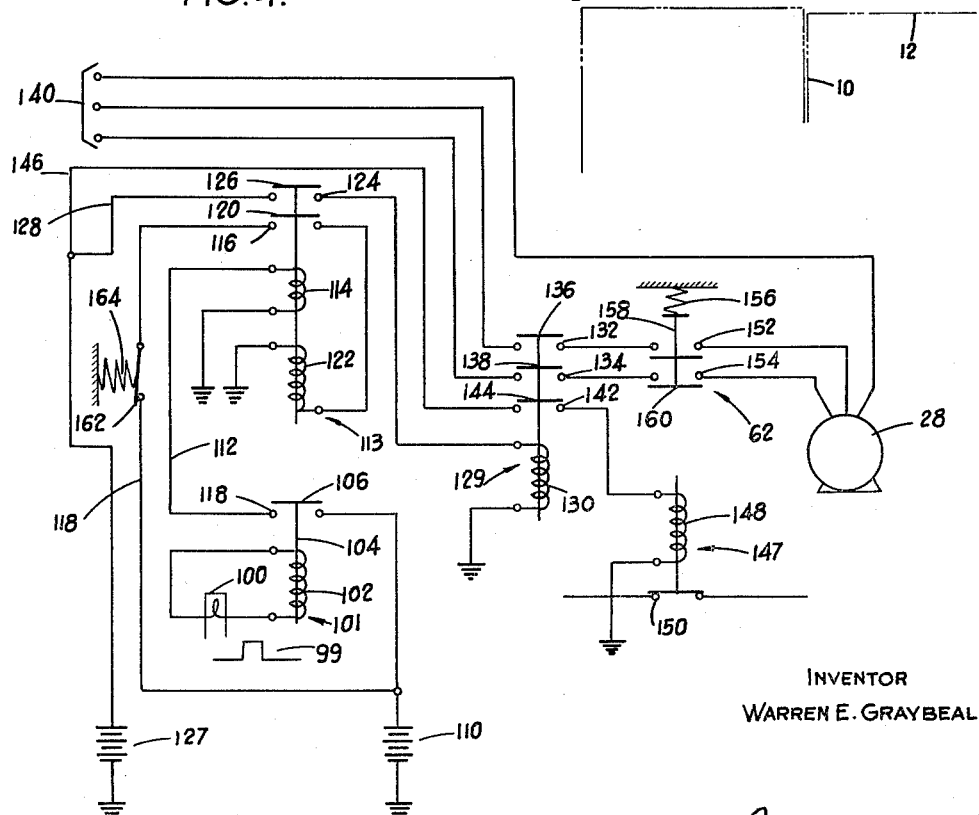
INVENTOR
WARREN E. GRAYBEAL
BY John C Black
ATTORNEY

United States Patent Office 3,045,801
Patented July 24, 1962

3,045,801
TRANSFER MECHANISM
Warren E. Graybeal, Villa Park, Ill., assignor to Stewart-Warner Corporation, Chicago, Ill., a corporation of Virginia
Filed Mar. 30, 1960, Ser. No. 18,614
18 Claims. (Cl. 198—24)

This invention relates to high speed conveyors, and more particularly to an improved transfer mechanism for such conveyors.

The rapid development in automation of manufacturing processes carried on in large industrial plants, has resulted in a definite need for high speed conveying systems for moving various objects such as articles or packages rapidly from one area to another. Since such conveyor systems generally employ a number of moving conveyor belts or other apparatus which may have intersections, as well as a number of loading and discharge stations, there is the further requirement of a transfer mechanism which operates at extremely high speed to accurately load and discharge the package to and from the conveyor.

The problem becomes even more complex when there is a lack of uniformity in the physical dimensions of the package or other object being carried by the conveyor system. In providing some means for removing the package from the conveyor, the transfer means should contact the element or package at the center or along a series of contact points on the package such that even pressure is exerted on the package for moving it accurately along a given line, this line generally being perpendicular to the direction of movement of the package along the conveyor belt.

With present day conveying systems having belts or the like operating at lineal speeds of 300 feet per minute or more, it can be appreciated where a package must be removed from the surface of the conveyor and transferred to another conveyor or to a receiving station, the transfer mechanism must also move at an extremely high speed in order to insure that the package is removed at the required station.

At the same time, since the transfer mechanism must also be operating at a relatively high velocity, the impact force on the transfer mechanism and the resultant load on the transfer drive means also increases greatly with increased speed of operation. Since the transfer mechanism must be sufficiently stable and durable to resist the intermittent impact forces resulting from the impact of the transfer mechanism on the package, the moving portion of the transfer structure is generally of sufficient mass to require somewhat powerful means for initiating movement of the transfer mechanism from the rest position because of the inertia of this mass. In addition, since the transfer mechanism must be returned to its initial starting position out of contact of the path of travel of subsequent packages on the conveyor, means for reversing the movement of the transfer means and returning the transfer mechanism to the original starting point must be provided. Inherently in such devices, with the mass moving at a relatively high velocity the moving inertia force must be overcome and the mechanism stopped and then the direction of movement must be reversed so as to allow the transfer mechanism to return to the initial starting point.

Besides these requirements, assuming that the conveyor system employs a moving belt for delivering the objects in a longitudinal direction, the number of unloading stations, loading stations and transfer stations to additional belts or other conveyor means may be effectively doubled by employing transfer mechanisms which will enable the object from the belt to be transferred or moved to either side of the conveyor. Since the transfer mechanism must include means for moving the objects to discharge stations lying within the same plane at right angles to the axis of the moving belt, it is apparent that at least a portion of the transfer mechanism must pass through the same plane and in opposite directions to discharge the objects on either side of the high speed conveyor belt. The individual right or left transfer mechanism must be actuated completely free from interference by its twin transfer mechanism located at the same transfer station.

It is therefore a primary object of this invention to provide a greatly improved transfer mechanism for a high speed conveyor system wherein objects may be accurately removed at high speeds, regardless of the size of the object (within predetermined limits), the high speed transfer mechanism allowing relatively close spacing of the objects upon the conveyor belt.

It is a further object of this invention to provide an improved transfer mechanism for a high speed conveyor system wherein objects may be transferred from the conveyor system to either side of the moving belt to discharge stations lying along the same plane at right angles to the axis of the conveyor system belt.

It is another object of this invention to provide a greatly improved transfer mechanism for a high speed conveyor system wherein the transfer mechanism may be moved into position for removing an object from the conveyor belt and returning the mechanism to the initial starting position with reduced power requirements while having increased speed of operation.

Other objects of this invention will be pointed out in the following detailed description and claims and illustrated in the accompanying drawings which disclose, by way of example, the principle of this invention and the best mode which has been contemplated of applying that principle.

In the drawings:

FIGURE 4 is a schematic view of the electrical control circuit for operation of the electrical drive means for the apparatus shown in FIGURES 1, 2, and 3.

FIGURE 5 is a front elevational view of a high speed conveyor system employing a transfer mechanism for discharging objects to one side of the conveyor belt only.

In general, the present invention comprises a transfer mechanism for a high speed conveyor system employing a horizontally moving conveyor belt. The transfer mechanism includes an elongated track member positioned above the belt and at right angles to the axis of movement, with a paddle member mounted on the track member for linear movement laterally across the upper surface of the belt. A connecting rod is pivotally connected to the paddle member and to a crank pin on a crankshaft. Driving means are provided to rotate the crankshaft. Rotation of the crankshaft results in the paddle member being reciprocated linearly across the track from one extreme position to the other, the connecting rod and the paddle member moving with simple harmonic motion. With this type of system, the initial load on the crankshaft driving means is at a minimum when the paddle member starts to move across the conveyor belt and the linear velocity of the paddle is at a maximum at the time of impact with the object on the conveyor, thereby providing maximum momentum of the paddle for initially contacting and starting the package off the conveyor.

Figure 1:
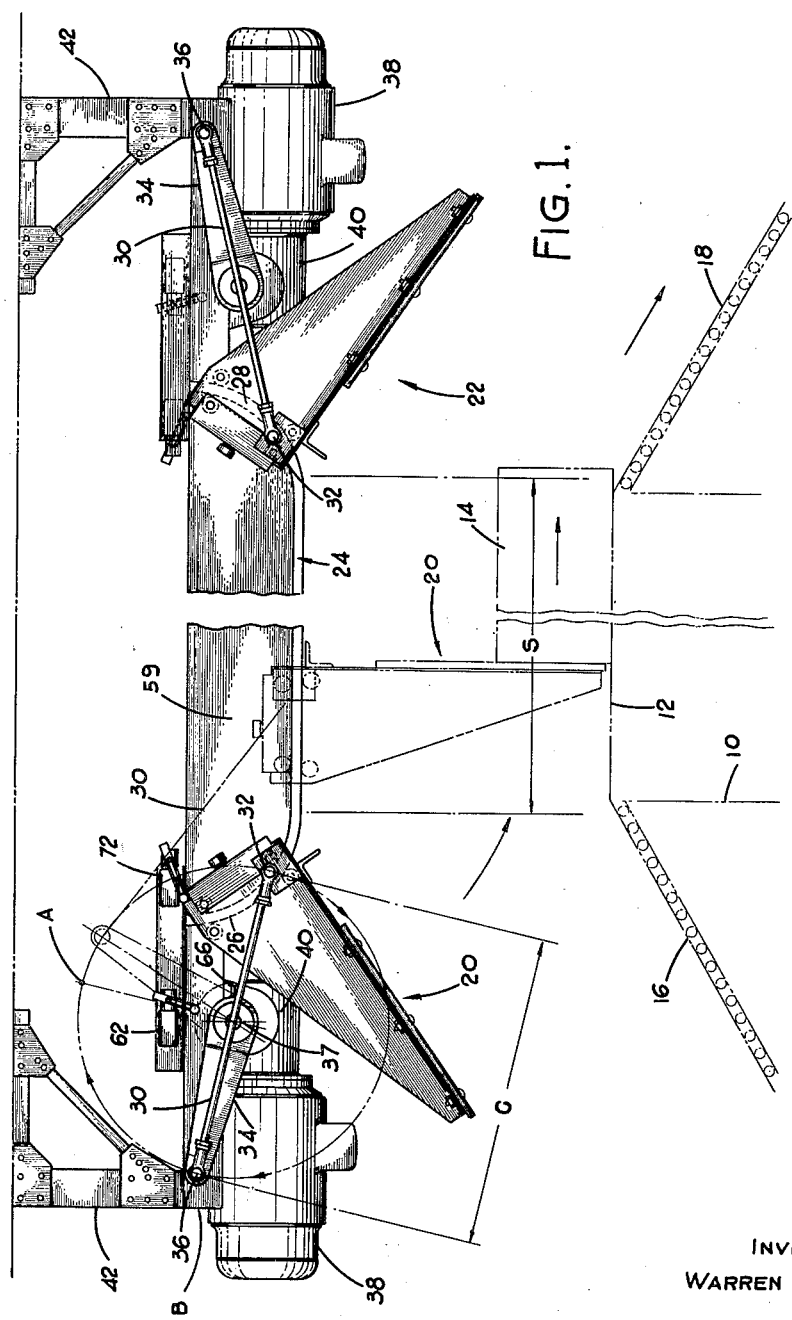
FIGURE 1 is a front elevational view of a high speed conveyor system employing the transfer mechanism of the present invention including a pair of discharge stations positioned opposite each other on either side of the conveyor.

Referring now to FIGURE 1, there is shown in dotted lines, a high speed conveyor system indicated generally at 10 which includes a horizontal belt member 12 which may be moving at a high speed and upon which is positioned a plurality of objects such as packages 14, which may be irregular in size within predetermined limits. A pair of inclined dotted lines, 16 and 19 on the left and right side of the conveyor system respectively denote a pair of opposite discharge stations which lie within the same plane at right angles to the horizontally moving conveyor belt 12. The embodiment of the transfer mechanism shown in FIGURE 1 makes use of a pair of oppositely directed paddle members 20 and 22 positioned to the left and right of the conveyor belt 12 and are positioned upon a laterally extending track member 24 with the paddle members being adapted to reciprocate laterally across the area immediately above the horizontally moving belt member 12 so as to sweep or discharge any packages 14 onto the discharge stations 16 and 18, depending upon which of the paddle members 20 or 22 are actuated. While track member 24 is essentially horizontal and at right angles to the axis of the conveyor belt, the terminal or end portions of the track member 24 on either side of the conveyor belt are curved upwardly as at 26 and 28 in such a manner that the paddle members 20 and 22 move only horizontally along the line of travel in the vicinity of the conveyor belt and rotate or pivot as they reach the curved portions 26 and 28 of track member 24. As indicated by the phantom line position of paddle member 20, at the point where it is contacting the package 14, it is moving purely along a horizontal plane determined by the flattened portion of the track member 24. The full line positions of both paddle member 20 and 22 show the paddle members at a rest or station position, while the phantom line position of paddle member 20 is shown to be nearly completely extended after making initial contact with package 14 which would normally lie centrally of the conveyor belt 12.

In order to achieve an efficient high speed transfer mechanism, a minimum amount of power is expended to initiate and complete lateral movement of the packages at high speed from a conveyor belt moving at a relatively great velocity. It is desirable that the load on the drive means be a minimum when the velocity is zero, that is when the transfer mechanism is at rest position. In addition it is desirous that the velocity of the moving member of the transfer mechanism be at a maximum at the time of impact between the moving mechanism and the relatively stationary package on the conveyor belt to provide maximum momentum to start the package moving off the conveyor. Both of these requirements are fully met by the present invention which employs simple harmonic motion means for moving either of the paddle members 20 and 22 on the track member 24. The chief characteristics of a device employing simple harmonic motion is that at the time when its acceleration is at a maximum, the velocity is zero and at the time that the velocity is at a maximum the acceleration is zero. One of the more familiar forms of apparatus which makes use of simple harmonic motion is a crank and pitman arrangement, such as the steam engine in which a reciprocating piston within a cylinder employs a connecting rod and a crankshaft for transforming reciprocating linear movement into unidirectional rotary movement.

In the present invention there is provided, a connecting rod 30 which is pivotally connected to the upper end of the forward wall of the paddle members 20 and 22 such as at pivot point 32 while the opposite end of the connecting rod 30 is pivotably connected at crank pin 36 to a crank or member 34 by any suitable means.

The crank member 34 of each unit is rotated about its axis 37 by suitable power means such as the electric motors 38, the motors 38 incorporating a gear box 40 of the conventional type for providing a desired angular velocity to the crank 34. A pair of support members 42 act to support the motors 38 as well as the transverse track member 24.

Figure 6:
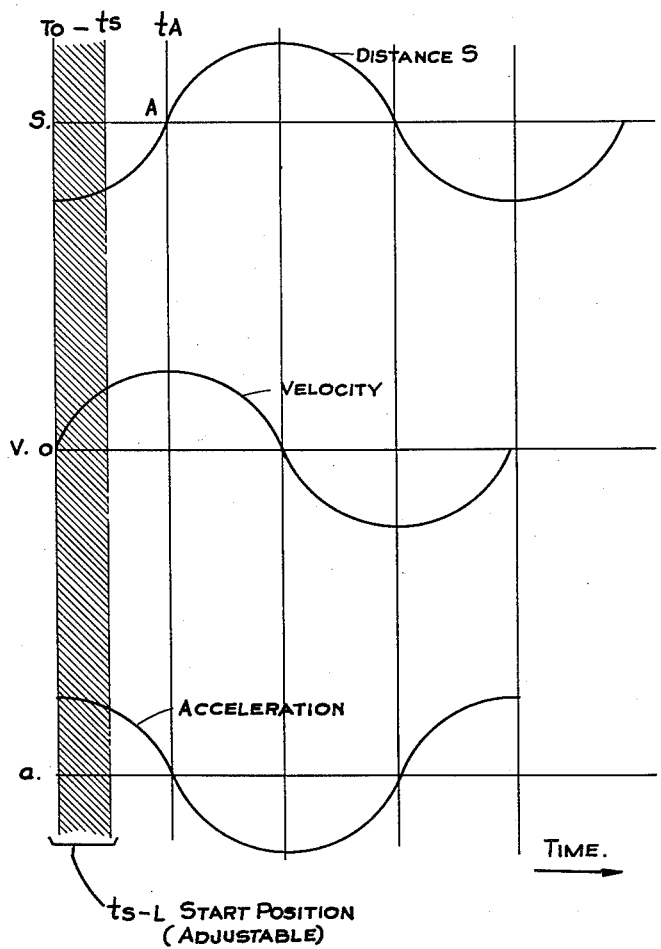
FIGURE 6 is a timing diagram illustrating the timing principles of this invention.

The advantageous use of harmonic motion produced by the crank arm 34 and connecting rod 30 to achieve the desired lateral movement of the transfer paddle members 20 and 22 can be fully appreciated by reference to FIGURE 6 which is a graph showing the distance S traveled by the crank pin 36. This is essentially the distance traveled by the upper forward face of the paddle members 20 and 22 of the embodiment shown in FIGURE 1. FIGURE 6 further includes a graph showing the linear velocity $v$ of crank pin 36 and the acceleration $a$ as the crank pin 36 rotates causing the paddle to travel under harmonic motion. The graphs are so drawn that a time $t_o$ the linear velocity of the crank pin 36 is zero while the distance S is shown to be at a maximum. While the distance of greatest interest is the linear distance of movement of the paddle members 20 and 22 as they reciprocate across the path of the package 14, the distance S on the graph is essentially the linear distance that the crank pin 36 moves as the crank is rotated. The distance S is shown to be zero when crank pin 36 is halfway between its extreme positions on either side of the crank axis. As indicated in FIGURE 1, this is generally at the point indicated by the letter A as shown on the dotted circular line indicating the path of movement of the crank pin 36 connecting the crank 34 and the connecting rod 30. In the full line position shown in FIGURE 1 the value of S indicating the linear displacement of crank pin 36 from point A is at a maximum while the linear velocity of the connecting rod is zero, with the acceleration also at a maximum value.

The advantage of having the velocity at a minimum or zero at the initial start position of a transfer mechanism is that it allows the load on the drive means or motor 38 to be greatly reduced even though the motor is overcoming the inertia of the transfer mechanism. As the crank 34 starts to rotate, the velocity of the connecting rod pivot pin 32 and hence the paddle increases rather rapidly and the acceleration decreases.

When the crank 34 is generally perpendicular to the axis of the connecting rod 30, i.e. at position A, its velocity will be at a maximum as is the linear velocity of the paddle members moving along the track 24. At this time the acceleration is zero and the paddle member has moved approximately halfway through its line of travel along the track 24. This is the instant most desirous for paddle member 20 or 22 to make contact with package 14 and since acceleration is zero, the only load on the drive means 38 is that provided by impact and again is much less than normally expected. The velocity being at a maximum insures that the momentum (mass times velocity) of the moving paddle member 20 is also at a maximum and the impact force presented by the relatively stationary package 14 will be directed against the drive means 38 at a time when minimum load is required by the motor to accelerate the transfer mechanism. Further rotation of the crank 34 results in a decrease in velocity of the paddle member 20 along with connecting rod 30, with acceleration in the opposite direction increasing. The paddle member then decelerates in a forward direction and stops.

At this point, the transfer mechanism employing the crank and connecting rod causes a reversal in lateral movement of the paddle member 20 on track 24 with acceleration again being a maximum with velocity zero. Therefore, the relative load required to reverse and accelerate the paddle member in the opposite direction is greatly reduced as the velocity of the paddle member is zero at the time of reversal of direction. This is accomplished by the unique application of harmonic motion to the transfer mechanism. The velocity of the paddle member 20 again increases in a reverse direction to a maximum with the acceleration dropping to zero and then the velocity of the paddle member drops to zero with maximum deceleration occurring after the crank 34 passes the position where it is perpendicular to connecting rod 30. Suitable means are employed for stopping the drive motor 38 so the connecting rod 34 and the crankshaft 30 are again in line or in the "at rest" position, ready to initiate another transfer operation when called upon.

While the paddle member 20 in FIGURE 1 appears to pivot or rotate about the connecting point of the connecting rod and the paddle member 20, in reality the paddle member is traveling upon the track member 24 and as it reaches the portion 26 of the track member which is curved, the paddle member 20 merely continues to slide on the track member and as a unit is rotated around until it is in the position as indicated in FIGURE 1 by the full lines. This is the "at rest" or initial start position of the apparatus.

Figure 2:
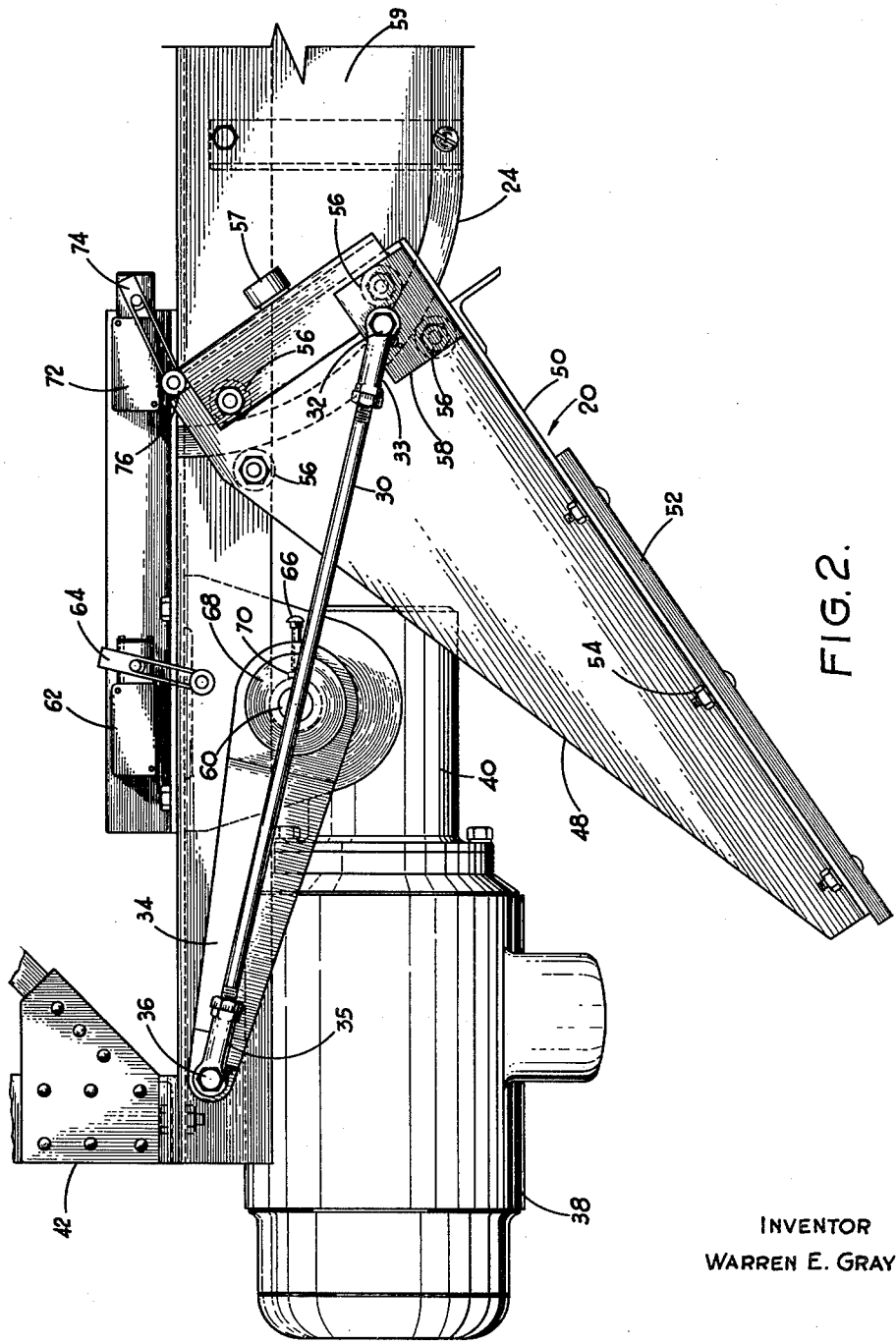
FIGURE 2 is a side elevational view of a portion of the transfer mechanism shown in FIGURE 1 for moving the object from the conveyor belt to the right side discharge station.
Figure 3:
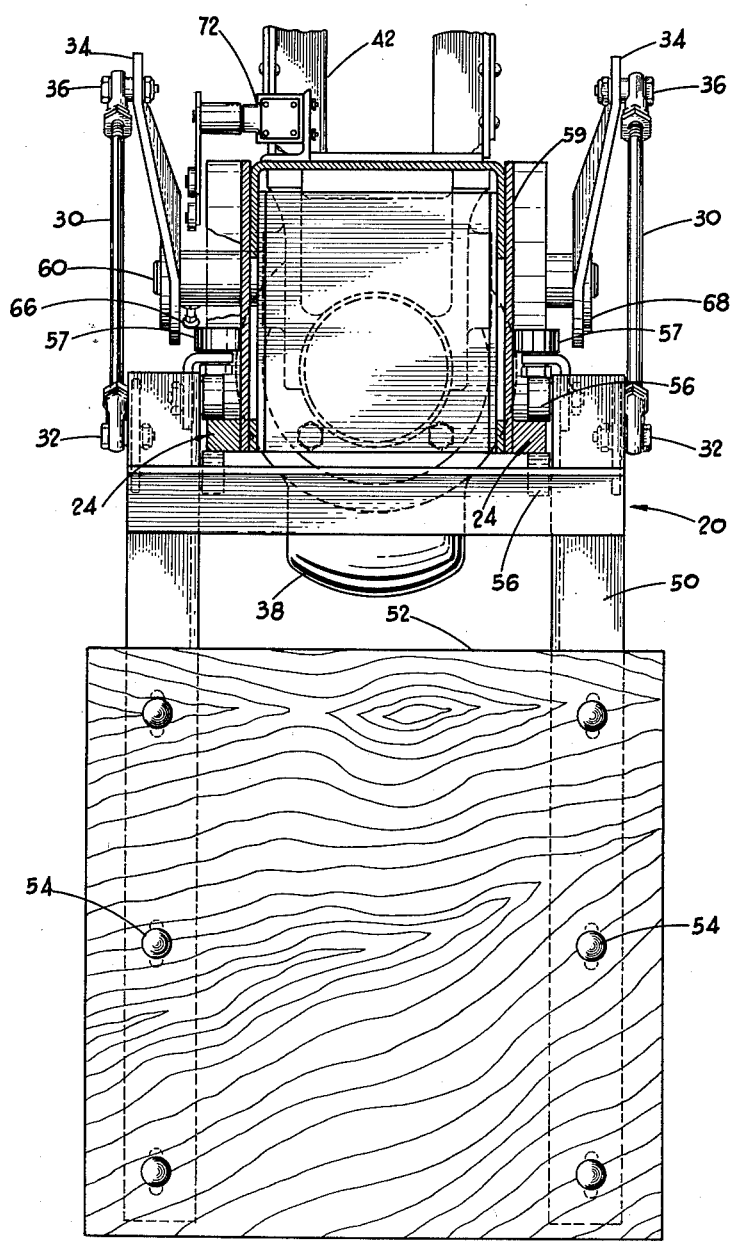
FIGURE 3 is an end elevational view of the apparatus shown in FIGURE 2.

To appreciate more fully the operation of the embodiment shown in FIGURE 1 and in order to show more adequately the adjustments which may be made in order to vary the time in which the paddle member will effectively reach the position or point of impact with the package on the conveyor belt, the portion of the apparatus shown in FIGURE 1 is shown enlarged in FIGURES 2 and 3.

The track member 24 as mentioned previously includes a rounded or curved portion 26 which effectively changes the track from a horizontal position to a vertical position at this point. The paddle member 20 includes a pair of metallic plate support members 48 including outwardly directed flange portions 50 to which is attached a wooden board member 52 forming the contact surface of the paddle member which may be rigidly coupled to the pair of metallic support members 48 by conventional bolts 54. At the upper end of the main support member 48 there is provided means for supporting a plurality of roller or guide members 56 which are mounted on the inner side of the plate member 48 and adapted to contact the track member 24 allowing the paddle member 20 to be guided on track 24 for easy movement thereon. Roller 57 bears against a side plate 59 for minimum friction as the paddle member 20 is transported along the track 24.

A plate member 58 is coupled to support member 48 and acts to support a pivot coupling member 33 which receives one end of the connecting rod 30, the other end of the connecting rod being connected to the crank 34 through pivotal connecting member 35 providing crank pin pivot 36. The crank 34 is rigidly coupled to a crankshaft member 60 which protrudes from the gear box 40 providing the drive means for rotating the crank 34. As mentioned previously, the electrical drive motor 38 which may be of the 3-phase alternating current type, acts to provide sufficient power to move the paddle member 20 through a single sinusoidal cycle of operation, with suitable electrical means operating to energize the motor 38.

In order to provide a single cycle reciprocating motion to the paddle member 20, there is provided electrical means which act to de-energize the drive motor once the cycle of operation has been completed. A suitable snap acting switch such as a microswitch 62 is rigidly affixed to the upper support member of the transfer device and includes as actuator arm 64 which is adapted to be operated in response to a position of rotation of the crank 34. Suitable actuator arm contact means such as an adjustable screw member 66 is provided and positioned so that it causes the contact member 64 of switch 62 to operate the switch to open the supply circuit of drive motor 38.

At the same time, suitable braking means are energized for positively stopping the motor upon energization of switch 62. The adjustable bolt member 66 is mounted on a peripheral flange 68 which is formed on crankshaft 60. Loosening of the locking member or nut 70 on the adjustable screw 66 allows the screw to be bodily rotated about the crankshaft 60 and to be locked at the position desired.

This is important, since, by placement of the adjustable screw 66, the point at which the paddle member 20 stops at the end of its cycle, which is also the point of initial movement during the next succeeding cycle, can be varied to meet the requirements of the particular conveyor system desired. Since the paddle member 20 stops in such a position that the crank 34 and the connecting rod are in general alignment, it is apparent that an adjustment of the adjusting bolt 66 will result in only a slight difference in the "at rest" position or initial starting position of the paddle member 20 and as a result, very fine adjustments may be provided. Because the present invention is employed on a conveyor system where the belt or other moving member moves linearly at a high rate of speed such as 300 feet per minute or more, it is especially desirous that fine timing adjustments may be made to the transfer mechanism.

In addition because of the speed at which the articles are moving, the paddle member must reciprocate completely across the conveyor belt through one cycle of operation in less than a second to allow for close spacing of the packages on the conveyor belt. With an arrangement of this type it is readily apparent that ease and reliability in adjustment in the timing of operation of the transfer mechanism helps considerably in providing a conveyor system and transfer arrangement which is highly dependable and will provide an ideal system for sorting and transferring non-uniform packages at speeds previously incapable of being reached because of the accuracy required in operational timing of the individual machines making up the system.

As indicated in FIGURE 2, there is provided adjacent the switch 62 another similar switch 72 which includes an actuator arm 74 adapted to make contact with the upper corner flange 76 of the support member 48. The microswitch 72 acts to open the line between the power supply and the motor of the opposing paddle member, which in this case would be paddle member 22. When the paddle member 20 is in the "at rest" or initial start position as indicated in FIGURE 2 the contact surface 76 of support member 48 is against the actuator 74 and acts to keep the line contacts closed to the motor of the opposite paddle member.

However, when the motor of the paddle member 20 is called upon to reciprocate the paddle member 20, the initial movement of the paddle member 20 from its "at rest" position causes the contact surface 76 to move away from the microswitch actuator arm 74 thus opening the circuit to the motor operating the opposing paddle member, 22. Therefore, for all intents and purposes, this motor is isolated from the system to prevent movement of the opposing paddle member 22 even if, through some fault, there would be a call for energization of this motor i.e. the opposed transfer mechanism are interlocked. There is of course, a like microswitch associated with the apparatus of the paddle member 22 acting to prevent energization of the drive motor for paddle member 20 during any movement of the paddle member 20 except at its position of rest.

Since the transfer apparatus of FIGURES 2 and 3 is identical but oppositely positioned with respect to the second paddle member 22 of the embodiment shown in FIGURE 1, there is the further necessity of preventing simultaneous operation of the drive means for the two paddle members 20 and 22, otherwise a collision would occur between the two paddle members.

The present system may be used advantageously with appropriate electronic means to record, at the time of loading on the conveyor the position or station at which the package is to be discharged or transferred. In systems of this type, program means such as magnetic tapes or other recording devices may be employed to initially record the designated discharge station at the time the package is placed on the conveyor and when the package on the conveyor reaches the transfer or discharge station, means may be employed to read off the recorded information and the recorded information is then utilized to actuate the electric motor drive means for transferring or discharging the package.

For instance, assuming that the packages are positioned upon a conveyor traveling at 300 feet per minute the trailing edge of one package may be arbitrarily positioned such that the leading edge of the following package is 2.6 inches therefrom. As the package approaches a divert station, the transfer mechanism must be actuated a certain time before the zone center line reaches the divert center line for optimum intersection betwen the paddle member and the package. Assuming a minimum 3 inch distance for actuating the transfer mechanism, it will take five tenths of a second for package number 2 to reach this point, during which time the paddle must have started from its initial "at rest" position, accelerated, reached the outer limit of travel and return to its non-active position.

While the means for initially recording the particular discharge station at the time that the article is placed on the conveyor and the particular means for initiating the action of the motor form no part of this invention, reference to FIGURE 4 will show schematically how a motor may be energized after receiving a pulse from an electronic recording means in order to move the paddle member from a position of rest to an operative position at the instant that the center line of the package or other object reaches the divert center line to insure that the package is moved exactly at right angles to the center line of the belt, without damage to the package or without interference to the movement of the following package.

There is shown schematically, FIGURE 4, element 100 which delivers a pulse such as a square wave pulse 99 to an actuator relay coil 102 which includes a plunger 104 having a contact surface 106 which closes normally open contacts 108. Closing of contacts 108 acts to connect a source of current such as battery 110 through line 112 to the holding relay pick coil 114 and thence to ground. The necessity of providing the holding relay 113 is because the actuating relay 101 receives the pulse only momentarily and the contacts 108 are open immediately after the pulse dies. In this regard, the source of current 110 is connected to holding relay contacts 116 by means of line 118 and holding relay movable contact member 120 allowing energization of the holding relay, hold coil 122 with the other end of this coil being connected directly to ground.

The energization of the holding relay 113 also acts to close normally open contacts 124 by means of auxiliary moving contact member 126 connecting the source of current 127 through line 128 to a motor solenoid coil 130. The motor solenoid 129 acts to close normally open contacts 132 and 134 by means of movable contact members 136 and 138, respectively, acting to connect the motor 28 to the source of 3-phase current 140. The holding relay 113 is generally incapable of directly closing the motor supply contacts 132 and 134 and for this reason auxiliary source of current 127 is used along with the heavier motor solenoid winding 130. At the same time, the motor solenoid 129 acts to close normally open contacts 142 by means of moving contact member 144 connecting source 127 through line 146 to a brake solenoid coil 148. The brake solenoid 147 operates to open normally closed contacts 150 releasing the motor brake during operation of the motor as required by pulsing the actuator relay 101.

In order to insure that the drive motor 28 associated with paddle member 22 is not operating at the same time as drive motor associated with the paddle 20, there is incorporated in the 3-phase supply circuit to each motor 28 a number of normally open contacts 152 and 154 which are adapted to be closed by moving contact members 158 and 160 associated with the microswitch 72 positioned adjacent the upper left hand corner of one of the support members 48 of the opposing paddle member. The microswitch 72 includes a biasing spring 156 which normally acts to open the contacts, but is compressed in response to the return of the paddle member to its initial starting position when contact surface 76 moves against the operating arm 74 of the switch acting to close the normally open contacts 152 and 154. In this manner when one of the transfer paddle members receives a pulse requesting energization of the drive motor associated with that paddle member, the initial movement of the paddle member to an operative position tends to prevent energization of the drive motor of the oppositely positioned paddle member at the same discharge station by preventing energization of the motor even though, through inadvertence, a pulse may be delivered through to the actuator relay associated with the driving means of the opposite paddle member.

A second microswitch 62, associated with the crank 34, acts to de-energize the motor and initiate the braking action at the end of each individual cycle of operation. The microswitch 62 includes normally closed contact member 162 which is held in this position by biasing spring 164. However, as the crank 34 rotates, the adjustable contact member 66 moves to a position where it forces the normally closed contacts 162 to open against the bias of the spring member 164 which opens the circuit to the holding coil of the holding relay 113. This de-energizes the holding relay 113, the motor solenoids 129, and the brake solenoid 147. The actuator 66 will rotate sufficiently past the actuator arm 64 such that the normally closed contacts 162 of microswitch 62 will re-close and all that is required to initiate another cycle of operation is the delivery of a new pulse by means 100 to the actuator relay coil 101.

In the operation of the present system, the placement of a package upon the conveyor belt results in the storage of a signal which operates to deliver a pulse by pulse delivery means 100 to the actuator relay coil 101 shortly before the package 14 gets to the center line position of the divert station. Energization of the actuator relay closes contacts 108 energizing the pick coil portion 114 of the holding relay 113 closing normally open contacts 120 energizing the holding coil 122 and keeping contacts 116 closed.

At the same time the motor solenoid 129 is energized which closes normally open contacts 132 and 134 placing the 3-phase motor 28 across the 3-phase line 140. Auxiliary motor solenoid contacts 142 are also closed energizing the brake solenoid relay 147 de-energizing the brake circuit by opening the normally closed contacts 150. This results in the initial rotation of the crank 34 from the "at rest " position. Acceleration is at a maximum, velocity is at a minimum and the load on motor 38 is relatively low. As the arm 34 rotates, the paddle member increases its velocity until it is near maximum at the point of impact with package 14. The transfer mechanism paddle member 20 decelerates to its fully extended position and then accelerates in a reverse direction to return to its initial starting position. Of course during maximum deceleration and maximum acceleration, the velocity of the paddle member is at a minimum and again the load on the drive motor 38 is relatively small. As the paddle member 20 moves back toward its "at rest" position, the flange 69 on shaft 60 rotates to such a position that actuator arm 64 is moved by means of adjustable bolt 66 to a position such that normally closed contacts 162 of microswitch 62 open de-energizing the motor and energizing the braking means. This completes a single cycle of operation for one of the paddle members.

In the embodiment shown in FIGURES 1, 2, and 3, the paddle members 20 and 22 after reciprocation on the track member 24 are rotated from a vertical plane to an angle of approximately 45° to the vertical for the express purpose of moving the paddle members away from the line of travel of a package which may be transferred in a direction towards one of the paddle members by the opposite paddle member. While one paddle member would not actually interfere with the movement of the opposite paddle member at the same transfer station, should the paddle member remain in a purely vertical plane, the package which would receive the impact from one paddle member could not move off the conveyor belt because of the presence of the opposite paddle member. For this reason the track 24 is made to curve at the end as at 26 and 28.

However, where there is provided a transfer station requiring package movement to only one side of the conveyor for transferring the package from one conveyor to another or simply as a discharge means for discharging the package to a discharge station on the opposite side of the conveyor belt as that of the paddle member there is no need for pivoting the generally vertically inclined paddle member. Such an arrangement is shown in the embodiment in FIGURE 5.

The paddle member 220 is positioned upon a track 224 such that it reciprocates along a purely horizontal line. In like manner to the first embodiment, the apparatus includes a pair of support members 248 to which is attached by means of bolt 254, a wooden impact receiving member 252, the impact member 252 being coupled directly to a pair of flange portions 250. A pivotal connection is made between the connecting rod 230 and a support member 248 the opposite end of the connecting rod 230 is connected to a crank 234 at pivot point 236. The crank 235 is rigidly attached to the main drive shaft 260 with a circular flange member 268 positioned on the shaft and acting to receive an adjusting bolt 266 including an adjusting nut 270. In like manner to the embodiment of FIGURE 1 the adjusting nut 266 may be loosened and moved around the periphery of the flange member 268 such that the position of the crank 234 and connecting rod 230, when the adjusting member 266 contacts movable arm 264, of microswitch 262 may vary depending upon the requirements of the particular system. Suitable support means are provided for supporting both the motor 238 and the gear box 240.

The only difference between this embodiment and the embodiment of FIGURE 1 is the fact that the paddle member reciprocates throughout the entire cycle of operation and there is no pivoting of the paddle member at the end of its cycle. Again, the velocity is at a minimum when the acceleration is at the maximum as the drive motor is energized and the paddle member moves forward from its initial "at rest" position. When the paddle member is in a position to contact the package on the conveyor belt, the velocity is at a maximum and the acceleration is zero. So again, relatively small loads are put on the drive motor at times when the inertia of the system would seem to require the greatest load.

With this particular embodiment, there is even greater ease in adjustment as far as the initial starting position is concerned. This of course is dependent upon the adjustment of the bolt 266 and its relationship with the crank and the connecting rod at the time it initiates de-energization of the drive motor and energization of the braking means. The electrical circuit and the system of operation is identical with the embodiment of FIGURES 1-4, the principal difference, is that the paddle member reciprocates in a horizontal plane only and there is no pivotal movement about the support or roller portion.

Since the paddle member already has its contact surface in a horizontal plane, it is positioned closer to the area occupied by the packages on the conveyor belt and it has a slower starting time since the "at rest" position when viewed on the graphs of FIGURE 6 shows distance S being at a miximum, the velocity $v$ being actually zero and the acceleration $a$ being maximum.

Because of the fact that the paddle member is closer to the packages at the time of starting, a small timing error may result in the paddle member hitting the leading edge of a wide package tending to cause the package to be discharged at some angle rather than perpendicular to the axis of the belt member. However, with the use of the adjustment member 266, the initial starting position may be controlled so as to eliminate any of the timing errors with the result that the paddle member strikes the center of the package causing it to be transferred or discharged along the desired plane at right angles to the moving conveyor belt.

In the high speed conveyor system employing the transfer mechanism of the present invention, a successful application was obtained wherein the transfer mechanism could accomplish an assortation rate of 60 items or packages per minute. The conveyor system included a conveyor belt two feet in width, a maximum package size of two feet by two feet by four feet with package spacing on five foot centers. The conveyor belt was moved at a linear speed of 300 feet per minute requiring as the maximum time to accomplish the transfer .25 second. With the packages on five foot centers, the maximum time from the start of the cycle to clear the conveyor for the following package was .50 second, requiring the paddle member to initiate its starting operation from a position remote from the package carrying area of the conveyor, move completely across the conveyor to a position somewhat past the line of impact, and return to the initial starting position all within one half a second.

The transfer apparatus of the present invention advantageously provides such high speed operation while having the advantages previously noted. The mechanism does not have to be started under load since the mechanism is loaded at time of impact when the velocity is the greatest and the acceleration is at a minimum. At the time of activation, the paddle is at negligible linear speed and the acceleration of the paddle is gradual and does not reach its peak speed until it has traveled about 5 inches. As the cycle approaches 180°, the gradual deceleration to zero, reverse of direction and acceleration takes place. In like manner there is a gradual deceleration of the paddle as it approaches 360°, its stopping point. The complete transfer and return is accomplished by harmonic motion attributed to the use of the crank and connecting rod for moving the paddle members of both the embodiments of FIGURE 1 and FIGURE 5. While the transfer mechanism has been shown in both the embodiments specifically for removing a package from a conveyor system, the mechanism may be likewise utilized as a means for loading the conveyor.

While there has been shown and described and pointed out the fundamental novel features of the invention as applied to preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for transferring an object to and from a moving conveyer member comprising; at least one paddle member for effecting said transfer, means for moving said paddle member transversely of said moving conveyer member to engage said object, said last mentioned means including drive means generating a unidirectional rotary motion, means for converting the motion of said drive means into reciprocating linear motion, means coupling said reciprocatory motion to said paddle member whereby said paddle member moves transversely of said conveyor member from a first position of zero velocity and maximum acceleration through a second position of zero acceleration and maximum velocity to a third position of zero velocity and maximum acceleration in the opposite direction, said paddle member being positioned and adapted to strike said object in the vicinity of said second position.

2. A transfer mechanism for transferring an object to and from a moving conveyor member comprising an elongated track member, a paddle member mounted on said track for linear movement transverse to said moving conveyor member, a crank, a connecting rod pivotally connected to said crank and said paddle member, unidirectional rotary drive means for rotating said crank whereby said paddle member is reciprocated linearly along said track member from one extreme position to another, means for initiating movement of said paddle member from one of said extreme positions to provide a minimum initial load on said unidirectional drive means and maximum linear velocity of said paddle member at the time of impact of said paddle member with said package.

3. Apparatus as claimed in claim number 2 further including means for stopping said crank in a position where the axis of said crank is in line with the axis of the connecting rod when said unidirectional drive means is de-energized.

4. Apparatus as claimed in claim number 3 including means for stopping said paddle member in an at rest position so that the axis of said crank and said connecting rod lie generally along the same line with the paddle member positioned to the same side of said conveyor member as the drive means.

5. An improved transfer mechanism for transferring an object to and from a high speed conveyor system including a horizontally disposed, moving conveyor surface carrying said object; said transfer mechanism including: a paddle member, means for supporting said paddle member for horizontal movement transversely of said moving conveyor surface, unidirectional rotary drive means, means coupling said unidirectional drive means to said paddle member, said coupling means acting to convert the motion of said drive means into reciprocating linear motion whereby said paddle member moves transversely of said conveyor surface from a first position of zero velocity and maximum acceleration through a second position of zero acceleration and maximum velocity to a third position of zero velocity and maximum acceleration in the opposite direction, with the impact between said paddle member and said object occurring in the vicinity of said second position.

6. Apparatus for transferring an object to and from a moving conveyor from either side thereof including; a pair of paddle members for effecting said transfer, means for moving either of said paddle members selectively transversely of said moving conveyor member to engage said object, said last mentioned means including drive means generating unidirectional rotary motion, means for converting the motion of said drive means into reciprocating linear motion, means coupling said reciprocatory motion to said paddle members whereby said paddle members move in harmonic motion transversely of said conveyor member from a first position of zero velocity and maximum acceleration through a second position of maximum velocity and zero acceleration to a third position of zero velocity and maximum acceleration in the opposite direction, said paddle member making contact with said object in the vicinity of said second position to minimize the load on said drive means during the complete operation of said transfer apparatus.

7. Apparatus as claimed in claim number 6 further including means associated with each of said paddle members for preventing operation of one of said paddle members when the other paddle member is in an operation movement.

8. Apparatus for transferring an object to and from a moving conveyor member from either side thereof comprising; a pair of paddle members for effecting said transfer, means mounting said paddle members for opposing movement transversely of said conveyor member to engage said object, a crank associated with each of said paddle members, unidirectional drive means for rotating said cranks in one direction only, connecting rods pivotally connecting each of said cranks to respective paddle members whereby said paddle members are reciprocated linearly, transversely of said conveyor member from a first position of zero velocity and maximum acceleration through a second position of maximum velocity and zero acceleration to a third position of zero velocity and maximum acceleration in the opposite direction, with said paddle member contacting said object in the vicinity of said second position whereby load on said transfer mechanism is uniformly distributed throughout the cycle of operation of said drive means.

9. Apparatus as claimed in claim 8 wherein said paddle members operate along a common path, but move in opposite directions, said apparatus further including means associated with each of said individual paddle members for preventing operation of said other paddle member when one of said paddle members is moving through an operating cycle.

10. Apparatus as claimed in claim 9 including a generally elongated track member, and means for mounting said paddle members on said track members for linear movement thereon.

11. Apparatus as claimed in claim 10 wherein said track member is positioned transversely of said moving conveyor member and is curved at the extreme end portions causing said paddle member to rotate upwardly from a generally vertical plane to a plane approaching the horizontal to effectively allow the discharge of the object from the conveyor member toward one of said paddle members in response to operation of said opposite paddle member.

12. Apparatus for transferring an object to and from a moving conveyor member including transfer stations on either side of said conveyor member lying within the same plane, said apparatus comprising a generally elongated track member extending between said transfer station transversely of said moving conveyor member, a pair of identical paddle members mounted on said track member for opposing linear movement thereon, said paddle members including a common path of travel transversely of said moving conveyor member to engage said object, unidirectional drive means, a crank driven by said drive means associated with each of said paddle members, a connecting rod pivotally connecting each of said cranks to its respective paddle member, whereby said paddle members are reciprocated linearly along said track member from a first position of zero velocity and maximum acceleration through a second position of maximum velocity and zero acceleration to a third position of zero velocity and maximum acceleration in the opposite direction, said paddle member striking said object at approximately said second position whereby the load on said unidirectional drive means remains generally constant through a complete cycle of operation.

13. Apparatus as claimed in claim 12 further including means associated with each of said paddle members to prevent simultaneous operation of said paddle members.

14. Apparatus as claimed in claim 12 whereby said first position occurs when said paddle member is in a position such that the crank and said connecting rod have their axis lying along the same plane with the paddle member positioned to the side of said moving conveyor member closest to the pivot point of said crank.

15. Apparatus as claimed in claim 14 further including means for stopping said unidirectional drive means when said paddle member occupies said first position.

16. Apparatus as claimed in claim 12 wherein said elongated track member includes portions curved upwardly from said moving conveyor member on either side of said conveyor member, said curved portions being directed away from said conveyor member whereby said paddle members are rotated from a generally vertical position to a position approximately 45 degrees from the vertical allowing an object to be moved past one of said pivoted paddle members in response to impact of said other paddle member moving transversely across said moving conveyor member.

17. Apparatus as claimed in claim 12 further including contact means mounted on said crank and adapted to rotate therewith, stationary means mounted in the path of said rotating means, said stationary means acting to disconnect said unidirectional drive means after one complete rotation of said crank to cause said paddle member to stop in said first position after passing through said second and third positions and returning to said first position.

18. Apparatus as claimed in claim 17 further including means for adjusting the angular position of said rotating contact means mounted on said crank, whereby the stopping and starting position of said paddle member may be varied.

References Cited in the file of this patent

UNITED STATES PATENTS

| | | |
|---|---|---|
| 2,770,346 | Oswalt | Nov. 13, 1956 |
| 2,931,483 | Gibbons | Apr. 5, 1960 |